(12) United States Patent
Liu et al.

(10) Patent No.: US 7,378,820 B2
(45) Date of Patent: May 27, 2008

(54) ELECTRICAL POWER GENERATION SYSTEM AND METHOD FOR GENERATING ELECTRICAL POWER

(75) Inventors: Yan Liu, Ballston, NY (US); Luis Jose Garces, Niskayuna, NY (US); Sumit Bose, Niskayuna, NY (US); Jovan Bebic, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 288 days.

(21) Appl. No.: 11/311,050

(22) Filed: Dec. 19, 2005

(65) Prior Publication Data

US 2007/0138792 A1   Jun. 21, 2007

(51) Int. Cl.
*F03D 9/00* (2006.01)
*H02P 9/04* (2006.01)
*H02P 9/00* (2006.01)
*H02P 11/00* (2006.01)

(52) U.S. Cl. .......................... 322/44; 290/55; 290/44; 322/37

(58) Field of Classification Search ................ 250/55, 250/54, 44, 43; 322/37, 44; 307/31, 18, 307/2, 26; 363/15, 34
See application file for complete search history.

(56) References Cited

U.S. PATENT DOCUMENTS

| 5,592,028 | A | 1/1997 | Pritchard ..................... 290/55 |
|---|---|---|---|
| 5,740,677 | A | 4/1998 | Vestesen ..................... 60/698 |
| 6,023,105 | A | 2/2000 | Youssef ....................... 290/54 |
| 6,134,124 | A * | 10/2000 | Jungreis et al. ............... 363/34 |
| 6,512,966 | B2 * | 1/2003 | Lof et al. .................... 700/291 |
| 6,605,880 | B1 | 8/2003 | Jaunich ....................... 307/80 |
| 6,670,721 | B2 | 12/2003 | Lof ............................. 290/44 |
| 6,787,933 | B2 * | 9/2004 | Claude et al. ................. 290/52 |
| 6,841,893 | B2 | 1/2005 | Maiwald ...................... 290/43 |
| 6,975,925 | B1 | 12/2005 | Barnes ......................... 700/286 |
| 2002/0110522 | A1 | 8/2002 | Chin ........................ 423/658.2 |
| 2003/0007369 | A1 * | 1/2003 | Gilbreth et al. ............... 363/35 |
| 2003/0202889 | A1 | 10/2003 | Myers ......................... 417/334 |
| 2003/0227276 | A1 | 12/2003 | Agbossou ..................... 320/112 |
| 2005/0012339 | A1 * | 1/2005 | Mikhail et al. ................ 290/44 |
| 2005/0225090 | A1 * | 10/2005 | Wobben ....................... 290/44 |

(Continued)

FOREIGN PATENT DOCUMENTS

EP 0 535 382 B1 9/1992

(Continued)

OTHER PUBLICATIONS

Contemporaneously filed US patent application for "System, Method, and Article of Manufacture for Controlling Operation of a Wind Farm" filed , 2005, U.S. Appl. No. 11/392,166.

(Continued)

*Primary Examiner*—Julio C. Gonzalez
(74) *Attorney, Agent, or Firm*—Ann M. Agosti; Patrick K. Patnode (57) ABSTRACT

An electrical power generation system and method for generating electrical power are provided. The electrical power generation system utilizes a master controller for controlling operation of devices coupled to an AC electrical grid and DC electrical grid based on parameter values associated with a renewable power generator.

22 Claims, 6 Drawing Sheets

U.S. PATENT DOCUMENTS

2005/0275386 A1* 12/2005 Jepsen et al. ................... 322/9
2007/0052244 A1*  3/2007 Hudson ....................... 290/44
2007/0138792 A1*  6/2007 Liu et al. .................... 290/1 A
2007/0235383 A1* 10/2007 Krokoszinski et al. . 210/321.65

FOREIGN PATENT DOCUMENTS

| EP | 1 137 149 A2 | 3/2001 |
| EP | 1 387 462 A2 | 1/2003 |
| JP | 20000073931 | 3/2000 |
| JP | 2002317750 | 10/2002 |
| WO | WO 02/21661 A1 | 3/2002 |

OTHER PUBLICATIONS

Contemporaneously filed US patent application for "System, Method, and Article of Manufacture for Determining Parameter Values Associated With an Electrical Grid," filed, 2005, U.S. Appl. No. 11/392,107.

* cited by examiner

ELECTRICAL POWER GENERATION SYSTEM AND METHOD FOR GENERATING ELECTRICAL POWER

BACKGROUND OF THE INVENTION

Power generation systems connected as an electrical mini-grid have utilized conventional power generators, such as fossil fuel power generators, and renewable power generators to supply electrical power to a load. A problem commonly associated with this type of power generation system is that the amount of power consumed by loads coupled to the electrical mini-grid as well as the power generated by the renewable sources connected to the mini-grid cannot be centrally controlled during operation. Accordingly, the power generation system is required to have connected (running or in stand-by) conventional power generators that have at least a capacity to produce 100% of the electrical power consumed by loads electrically coupled to the mini-grid, irrespective of whether the renewable power generators can supply a portion of the electrical power. Thus, the power generation system utilizes more conventional power generators than actually needed which increases a cost of operating the power generation system and makes the mini-grid operation not rentable and further impedes its utilization on a large scale.

BRIEF DESCRIPTION OF THE INVENTION

An electrical power generation system in accordance with an exemplary embodiment is provided. The electrical power generation system includes a first renewable power generator configured to generate a first AC voltage. The first renewable power generator has a first controller configured to generate a first message having at least a first parameter value associated with the first renewable power generator. The electrical power generation system further includes an AC/DC converter configured to convert the first AC voltage to a DC voltage where at least a portion of the DC voltage is transmitted through a DC electrical grid. The electrical power generation system further includes a DC/AC converter configured to convert a portion of the DC voltage from the AC/DC converter to a second AC voltage that is transmitted through an AC electrical grid. The electrical power generation system further includes a second controller configured to receive the first message. The second controller is further configured to control operation of a first device electrically coupled to at least one of the AC electrical grid and the DC electrical grid based on the first parameter value.

A method for generating electrical power utilizing an electrical power generation system in accordance with another exemplary embodiment is provided. The system includes a first renewable power generator having a first controller. The first renewable power generator is configured to generate a first AC voltage. The system further includes an AC/DC converter electrically coupled between the first renewable power generator and a DC electrical grid. The system further includes a DC/AC converter electrically coupled between the AC/DC converter and an AC electrical grid. The system further includes a second controller operably communicating with the first controller. The method includes generating a first AC voltage utilizing the first renewable power generator. The method further includes converting the first AC voltage to a DC voltage utilizing the AC/DC converter where at least a portion of the DC voltage is transmitted through the DC electrical grid. The method further includes converting a portion of the DC voltage from the AC/DC converter to a second AC voltage utilizing the DC/AC converter that is transmitted through the AC electrical grid. The method further includes generating a first message having at least a first parameter value that is associated with the first renewable power generator utilizing the first controller, that is received by the second controller. The method further includes controlling operation of a first device electrically coupled to at least one of the AC electrical grid and the DC electrical grid based on the first parameter value utilizing the second controller.

An electrical power generation system in accordance with another exemplary embodiment is provided. The electrical power generation system includes a first renewable power generator configured to generate a first DC voltage. The first renewable power generator has a first controller configured to generate a first message having at least a first parameter value associated with the first renewable power generator. At least a portion of the first DC voltage is applied to a DC electrical grid. The electrical power generation system further includes a DC/AC converter electrically coupled to the first renewable power generator. The DC/AC converter is configured to convert a portion of the DC voltage to a first AC voltage that is transmitted through an AC electrical grid. The electrical power generation system further includes a second controller configured to receive the first message. The second controller is further configured to control operation of a first device electrically coupled to at least one of the AC electrical grid and the DC electrical grid based on the first parameter value.

Other systems and/or methods according to the embodiments will become or are apparent to one with skill in the art upon review of the following drawings and detailed description. It is intended that all such additional systems and methods be within the scope of the present invention, and be protected by the accompanying claims.

DETAILED DESCRIPTION OF THE INVENTION

Figure 1:
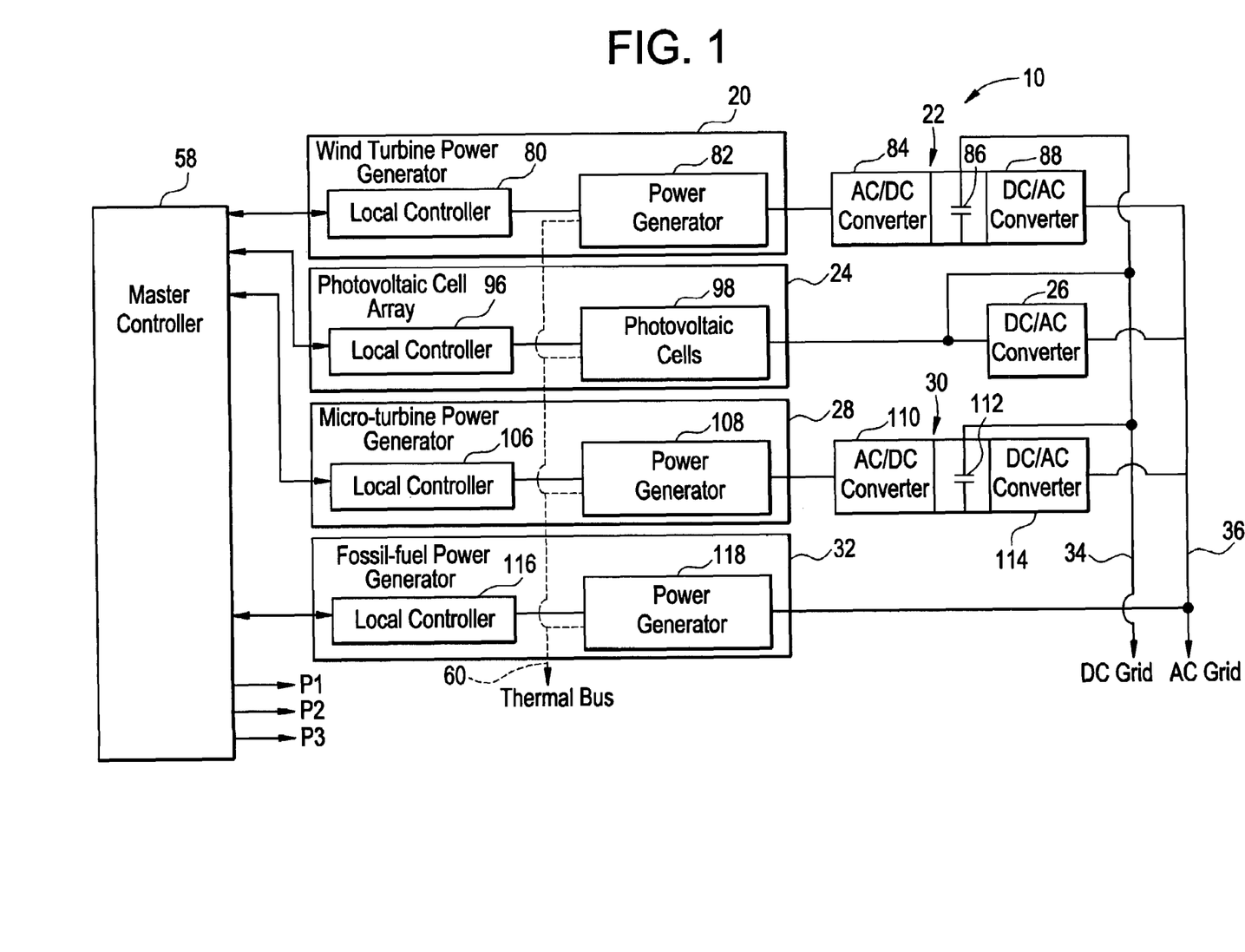
FIGS. 1 and 2 are block diagrams of an electrical power generation system in accordance with an exemplary embodiment.

Referring to FIG. 1, an electrical power generation system 10 for generating electrical power is illustrated. The electrical power generation system 10 generates voltages using renewable power generators and conventional power generators that are transferred via DC electrical grid and an AC electrical grid to load devices. A renewable power generator is defined as any power generation device that utilizes a renewable energy source (e.g. wind energy, solar energy, geothermal energy, hydroelectric energy) to generate electrical power. A non-renewable power generator is defined as any power generation device that utilizes a fossil-fuel (e.g., gasoline, diesel, coal, natural gas) to generate electrical power. The electrical power generation system 10 includes a wind turbine power generator 20, a voltage conversion device 22, a photovoltaic cell array 24, an DC/AC converter 26, a micro-turbine power generator 28, a voltage conversion device 30, a non-renewable power generator 32, a DC electrical grid 34, an AC electrical grid 36, controllable load devices 40, 42, an energy storage device 44, DC/AC converters 46, 48, AC/DC converters 50, 52, non-controllable load devices 54, 56, a master controller 58, a thermal bus 60, a thermal generator 62, a thermal energy storage device 64, and a thermal load 66.

The wind turbine power generator 20 is provided to generate an AC voltage utilizing wind energy. The wind turbine power generator 20 includes a local controller 80 and a power generator 82. The power generator 82 is configured to generate an AC voltage based upon rotation of a turbine blade (not shown), that is transmitted to the voltage conversion device 22. The local controller 80 is configured to control operation of the power generator 82 and to calculate a predicted power level of the power generator 82 based on measured operational parameters associated with the power generator 82. The local controller 80 operably communicates with the master controller 58 and is further configured to transmit a message having the predicted power level of the power generator 80 to the master controller 58.

The voltage conversion device 22 is provided to convert the AC voltage received from the wind turbine power generator 22 to a DC voltage that is applied to the DC electrical grid 34 and an AC voltage that is applied to the AC electrical grid 36. The voltage conversion device 22 includes an AC/DC converter 84, a capacitor 86, and a DC/AC converter 88. The AC/DC converter 84 is electrically coupled between the power generator 82 and the capacitor 86. The capacitor 86 is electrically coupled to the AC/DC converter 84, the DC electrical grid 34, and the DC/AC converter 88. The DC/AC converter 88 is electrically coupled between the capacitor 86 and the AC electrical grid 36. During operation, the AC/DC converter 84 converts the AC voltage from the power generator 82 into a DC voltage that is stored in the capacitor 86. The DC voltage from the capacitor 86 is applied to the DC electrical grid 34. Further, the DC/AC converter 88 converts the DC voltage from the capacitor 86 into an AC voltage that is applied to the AC electrical grid 36.

The photovoltaic cell array 24 is provided to generate a DC voltage utilizing solar energy. The photovoltaic cell array 24 includes a local controller 96 and photovoltaic cells 98. The photovoltaic cells 98 are configured to generate a DC voltage based upon an amount of solar energy received by the photovoltaic cells 98, which is transmitted to the DC electrical grid 34 and the DC/AC converter 26. The local controller 96 is configured to control operation of the photovoltaic cells 98 and to calculate a predicted power level of the photovoltaic cells 98 based on a measured operational parameters associated with the photovoltaic cells 98. The local controller 96 operably communicates with the master controller 58 and is further configured to transmit a message having the predicted power level of the photovoltaic cells 98 to the master controller 58.

The DC/AC converter 26 is provided to convert the DC voltage received from the photovoltaic cell array 24 to an AC voltage that is applied to the AC electrical grid 36. The DC/AC converter 26 is electrically coupled between the photovoltaic cells 98 and the AC electrical grid 36.

The micro-turbine power generator 28 is provided to generate an AC voltage. The micro-turbine power generator 28 includes a local controller 106 and a power generator 108. The power generator 108 is configured to generate an AC voltage that is transmitted to the voltage conversion device 30. The local controller 106 is configured to control operation of the power generator 108 and to calculate a predicted power level of the power generator 108 based on measured operational parameters associated with the power generator 108. The local controller 108 operably communicates with the master controller 58 and is further configured to transmit a message having the predicted power level of the power generator 108 to the master controller 58.

The voltage conversion device 30 is provided to convert the AC voltage received from the micro-turbine power generator 28 to a DC voltage that is applied to the DC electrical grid 34 and an AC voltage that is applied to the AC electrical grid 36. The voltage conversion device 30 includes an AC/DC converter 110, a capacitor 112, and a DC/AC converter 114. The AC/DC converter 110 is electrically coupled between the power generator 108 and the capacitor 112. The capacitor 112 is electrically coupled to the AC/DC converter 110, the DC electrical grid 34, and the DC/AC converter 114. The DC/AC converter 114 is electrically coupled between the capacitor 112 and the AC electrical grid 36. During operation, the AC/DC converter 110 converts the AC voltage from the power generator 108 into a DC voltage that is stored in the capacitor 112. The DC voltage from the capacitor 112 is applied to the DC electrical grid 34. Further, the DC/AC converter 114 converts the DC voltage from the capacitor 112 into an AC voltage that is applied to the AC electrical grid 36.

The non-renewable power generator 32 is provided to generate an AC voltage by combusting a fossil fuel, such as gasoline, diesel, or natural gas for example. The fossil fuel power generator 32 includes a local controller 116 and a power generator 118. The power generator 118 is configured to generate an AC voltage by combusting a fossil fuel, which is transmitted to the AC electrical grid 36. The local controller 116 is configured to control operation of the power generator 118. The local controller 116 operably communicates with the master controller 58 and is further configured to induce the power generator 118 to generate an AC voltage in response to a command message from the master controller 58.

Figure 2:
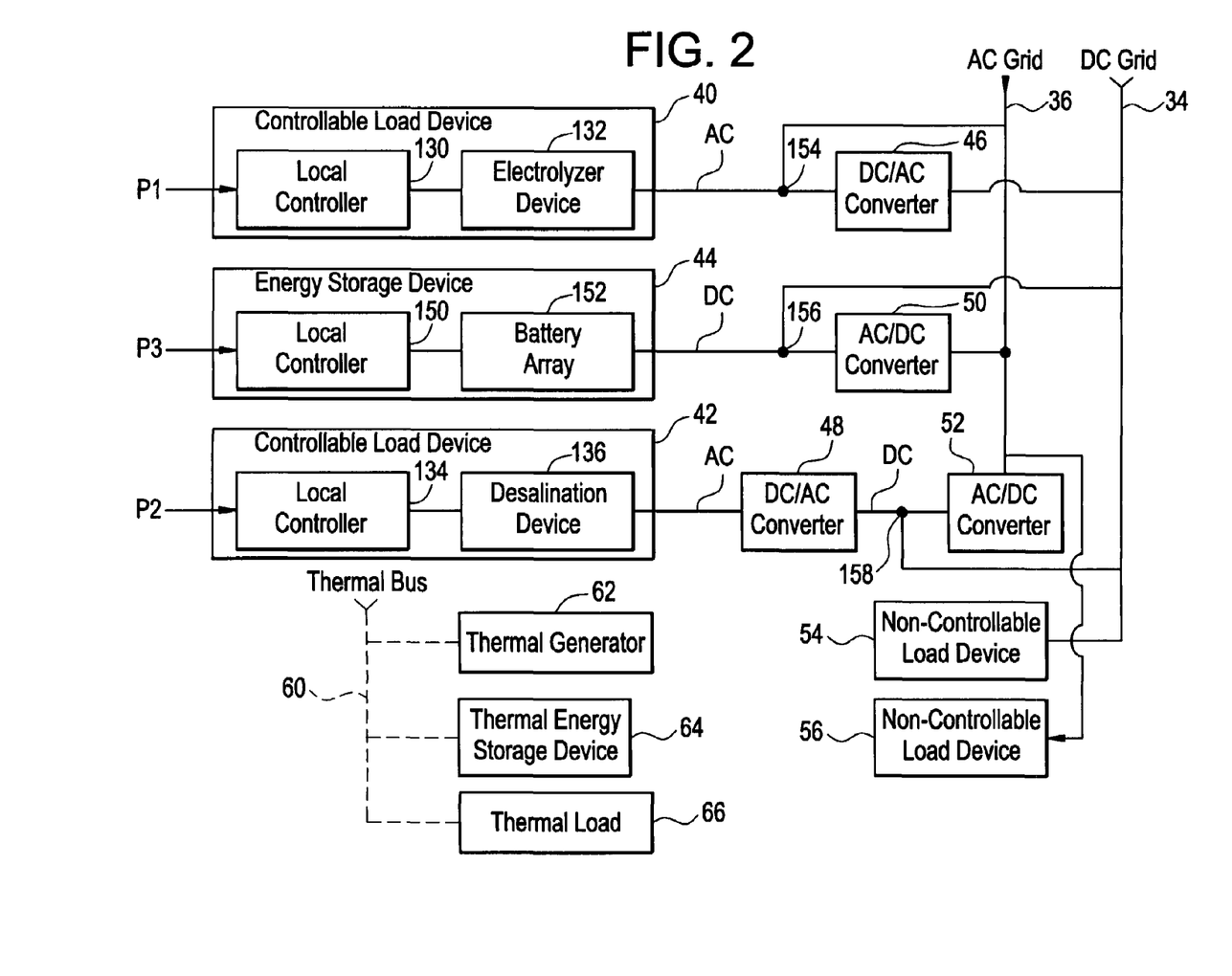

Referring to FIG. 2, the controllable load device 40 is provided to produce hydrogen gas from water. Further, the controllable load device 40 is configured to consume a variable amount of electrical power from the AC electrical grid 36 and the DC electrical grid 34. The controllable load device 40 includes a local controller 130 and an electrolyzer device 132. In the exemplary embodiment, the electrolyzer device 132 is electrically coupled to both the AC electrical grid 36 and the DC/AC converter 46. In an alternate exemplary embodiment, the electrolyzer device 132 could be coupled to only one of the DC/AC converter and the AC electrical grid 36. The electrolyzer device 132 receives an AC voltage and generates a predetermined amount of hydrogen gas utilizing the AC voltage. The local controller 130 is configured to control an amount of electrical power utilized by the electrolyzer device 132 when producing the hydrogen gas from water. The local controller 130 operably communicates with the master controller 58 and is further configured to induce the electrolyzer device 132 to consume a predetermined amount of electrical power in response to a message having a commanded power value from the master controller 58.

The DC/AC converter 46 is electrically coupled between the DC electrical grid 34 and the electrolyzer device 132. The DC/AC converter 46 is provided to convert a DC voltage on the DC electrical grid 34 to an AC voltage. The AC voltage at a node 154 produced by both the AC electrical 36 and the DC/AC converter 46 is utilized by the electrolyzer device 132 to produce hydrogen gas from water.

The controllable load device 42 is provided to purify brackish or salty water. Further, the controllable load device 42 is configured to consume a variable amount of electrical power from the AC electrical grid 36 and the DC electrical grid 34. The controllable load device 42 includes a local controller 134 and a desalination device 136. The desalination device 136 is electrically coupled to the DC/AC converter 48. The desalination device 136 receives an AC voltage to drive water pumps (not shown) that purify a predetermined amount of water by removing salt and other impurities from the water. The local controller 134 is configured to control an amount of electrical power utilized by the desalination device 136 when purifying water. The local controller 134 operably communicates with the master controller 58 and is further configured to induce the desalination device 136 to consume a predetermined amount of electrical power in response to a message having a commanded power value from the master controller 58.

The AC/DC converter 52 is electrically coupled between the AC electrical grid 36 and the DC/AC converter 48. The AC/DC converter 52 is configured to convert the AC voltage from the AC electrical grid 36 to a DC voltage that is received by the DC/AC converter 48. The DC/AC converter 48 is electrically coupled between the AC/DC converter 52 and the desalination device 136. The DC/AC converter 48 is configured to convert a DC voltage received from both the DC electrical grid 34 and the AC/DC converter 52 at a node 158, to an AC voltage utilized by the desalination device 136.

The energy storage device 44 is provided to either store electrical energy from the AC electrical grid 36 and the DC electrical grid 34, or provide electrical energy to the DC electrical grid 34. The energy storage device 44 includes a local controller 150 and a battery array 152 comprising a plurality of batteries. The battery array 152 is electrically coupled to the AC/DC converter 50. The local controller 150 operably communicates with the master controller 58. The local controller 150 is configured to control whether the battery array 152 stores electrical energy from the electrical grids 34, 36 or transfers electrical energy to the electrical grids 34, 36, based on a message having a power storage value received from the master controller 58.

The AC/DC converter 50 is electrically coupled between the AC electrical grid 36 and the battery array 152. The AC/DC converter 50 is configured to convert the AC voltage from the AC electrical grid 36 to a DC voltage that is received by the battery array 152.

The non-controllable load device 54 is electrically coupled to the DC electrical grid 34. The non-controllable load device 54 is configured to consume a predetermined constant amount of electrical power from the DC electrical grid 34 when the device is activated. For example, the non-controllable load device 54 comprises one or more of an electric light, an electric motor, a heating element, or the like.

The non-controllable load device 56 is electrically coupled to the AC electrical grid 36. The non-controllable load device 56 is configured to consume a predetermined constant amount of electrical power from the AC electrical grid 36 when the device is activated. For example, the non-controllable load device 56 comprises one or more of an electric light, an electric motor, a heating element, or the like.

The AC electrical grid 36 is provided to transfer an AC voltage from the DC/AC converters 88, 104, 114 and fossil fuel power generator 32 to load devices. In the exemplary embodiment, the AC electrical grid 36 comprises an electrical mini-grid. It should be noted that the AC electrical grid 36 can operate as a stand-alone electrical mini-grid or can be electrically coupled to a primary electrical grid. For example, the AC electrical grid 36 could operate as a stand-along electrical mini-grid for distributing power to load devices on an island.

The DC electrical grid 34 is provided to transfer a DC voltage from the AC/DC converters 84, 100, 110, and battery array 152 to load devices. In the exemplary embodiment, the DC electrical grid 34 comprises an electrical mini-electrical.

The master controller 58 is provided to coordinate electrical power generation by the wind turbine power generator 20, the photovoltaic cell array 24, the micro-turbine power generator 28, and the fossil fuel power generator 32. The master controller 58 is further provided to control electrical power consumption by the controllable load devices 40, 42, and either power consumption or power delivery by the energy storage device 44. The master controller 58 operably communicates with the local controllers 80, 96, 106, 116, 130, 134, and 150. In particular, the master controller 58 is configured to generate messages having command values that are transmitted to the local controllers 80, 96, 106, 116, 130, 134, 150 for controlling operation of the generators 20, 24, 28, 32 and devices 40, 42, 44, respectively.

The thermal generator 62 is thermally coupled to the power generator 82, the photovoltaic cells 98, the power generator 108, and the power generator 118, to extract heat energy therefrom. The thermal generator 62 transfers a fluid through the thermal bus 60 containing the extracted heat energy to the thermal energy storage device 64 and to the thermal load 66. The thermal energy storage device 64 is configured to store the heat energy from the fluid therein.

Referring to FIGS. 3-6, a method for generating electrical power utilizing the electrical power generation system 10 will now be explained.

Figure 3:
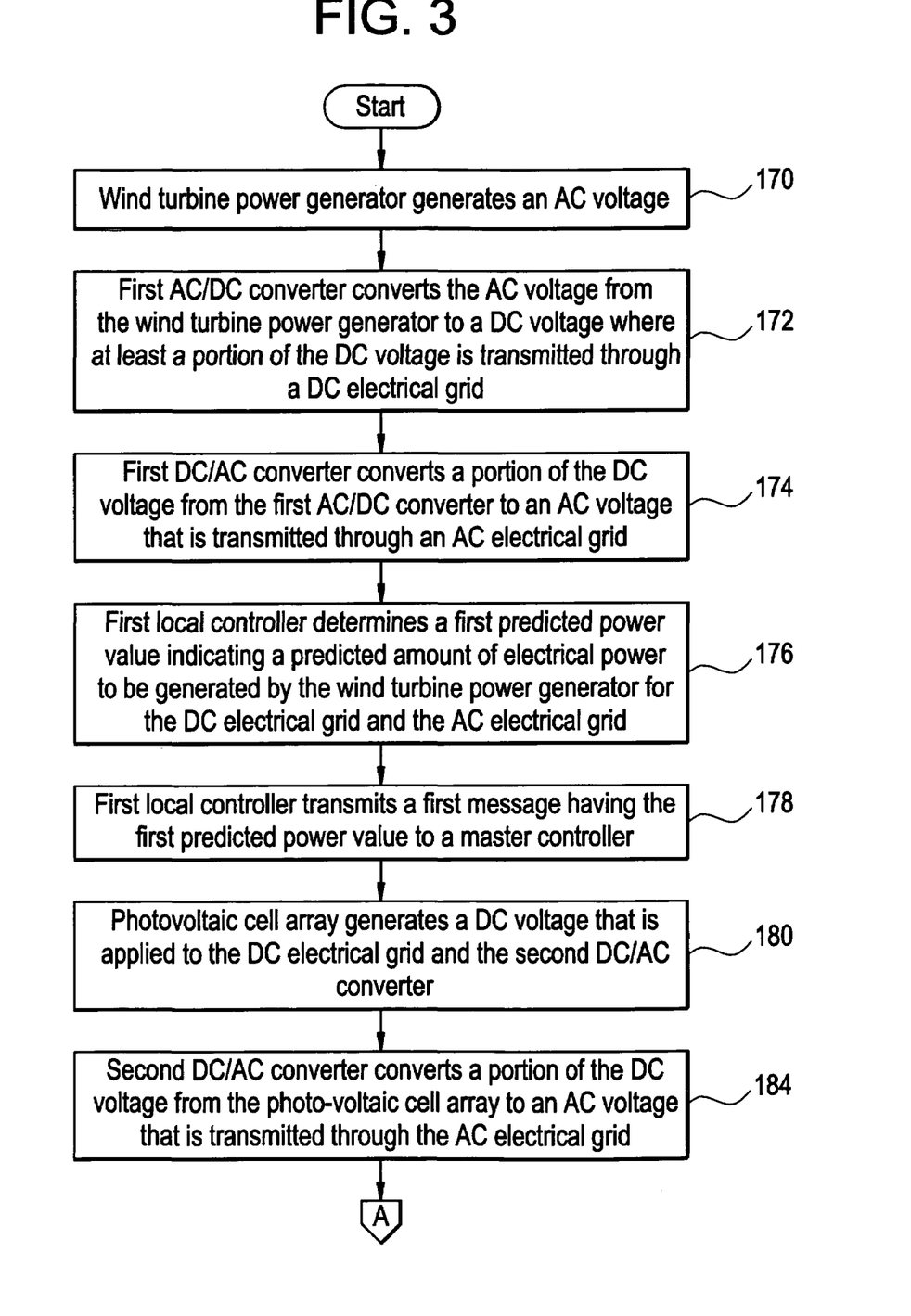
FIGS. 3-6 are flowcharts of a method for generating electrical power utilizing the system of FIGS. 1 and 2, in accordance with another exemplary embodiment.

At step 170, the wind turbine power generator 20 generates an AC voltage.

At step 172, the AC/DC converter 84 converts the AC voltage from the wind turbine power generator 20 to a DC voltage where at least a portion of the DC voltage is transmitted through the DC electrical grid 34.

At step 174, the DC/AC converter 88 converts a portion of the DC voltage from the AC/DC converter 84 to an AC voltage that is transmitted through the AC electrical grid 36.

At step 176, the local controller 80 determines a first predicted power value indicating a predicted amount of electrical power to be generated by the wind turbine power generator 20 for the DC electrical grid 34 and the AC electrical grid 36.

At step 178, the local controller 80 transmits a first message having the first predicted power value to the master controller 58.

At step 180, the photovoltaic cell array 24 generates a DC voltage that is applied to the DC electrical grid 34 and the DC/AC converter 26.

At step 184, the DC/AC converter 26 converts a portion of the DC voltage from the photovoltaic cell array 24 to an AC voltage that is transmitted through the AC electrical grid 36.

At step 186, the local controller 96 determines a second predicted power value indicating a predicted amount of electrical power to be generated by the photovoltaic cell array 24 for the DC electrical grid 34 and the AC electrical grid 36.

At step 188, the local controller 96 transmits a second message having the second predicted power value to the master controller 58.

Figure 4:
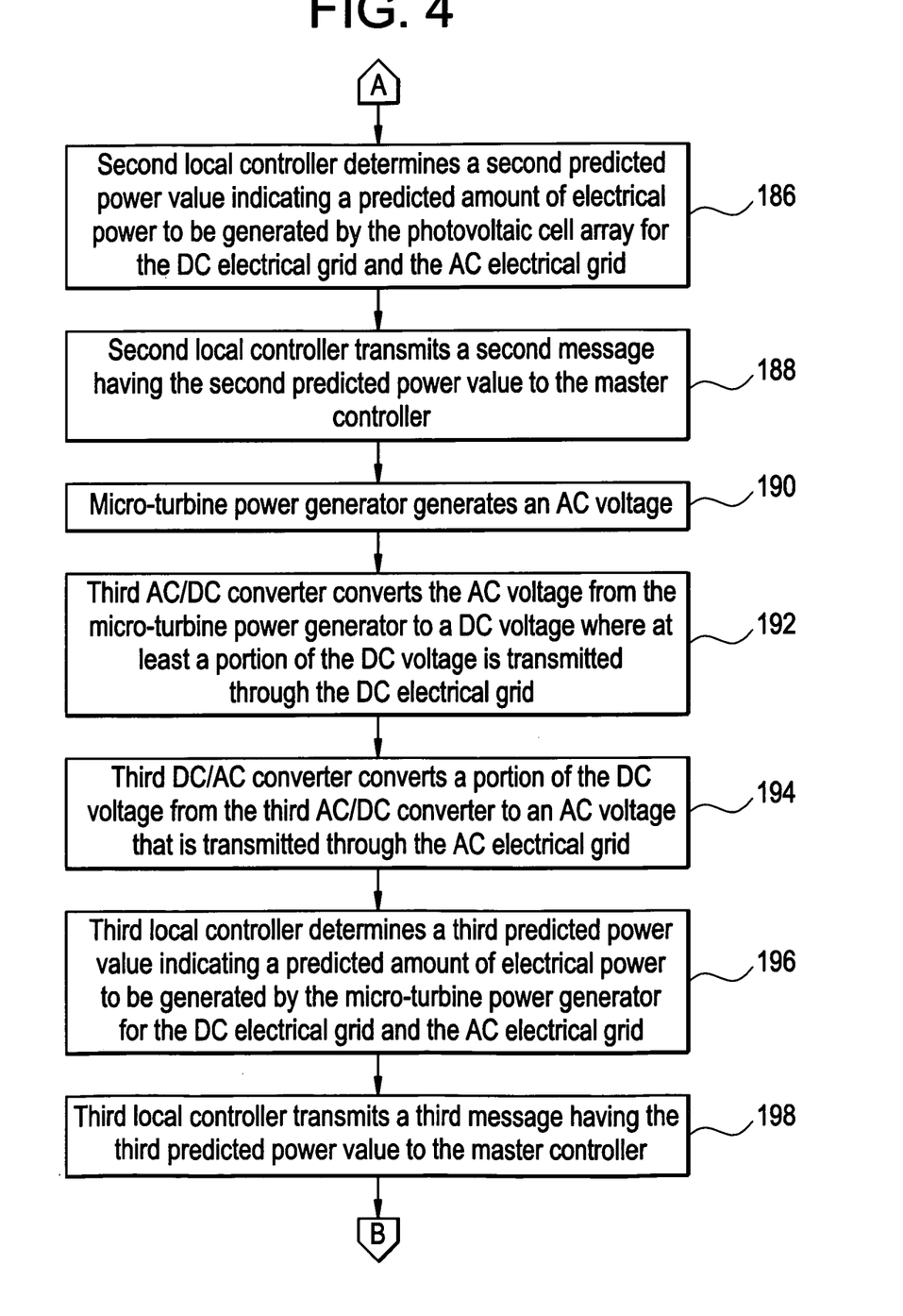

At step 190, the micro-turbine power generator 28 generates an AC voltage.

At step 192, the AC/DC converter 110 converts the AC voltage from the micro-turbine power generator 28 to a DC voltage where at least a portion of the DC voltage is transmitted through the DC electrical grid 34.

At step 194, the DC/AC converter 114 converts a portion of the DC voltage from the AC/DC converter 110 to an AC voltage that is transmitted through the AC electrical grid 36.

At step 196, the local controller 106 determines a third predicted power value indicating a predicted amount of electrical power to be generated by the micro-turbine power generator 28 for the DC electrical grid 34 and the AC electrical grid 36.

At step 198, the local controller 106 transmits a third message having the third predicted power value to the master controller 58.

At step 200, the AC electrical grid 36 supplies an AC voltage to the controllable load device 40, and the DC/AC converter 46 converts the DC voltage from the DC electrical grid 34 to an AC voltage that is received by the controllable load device 40.

At step 202, the AC electrical grid 36 supplies an AC voltage to the AC/DC converter 52 that converts an AC voltage from the AC electrical grid 36 to a DC voltage, the DC voltage from the AC/DC converter 52 and the DC electrical grid 34 being converted to an AC voltage utilizing the DC/AC converter 48 that is received by the controllable load device 42.

Figure 5:
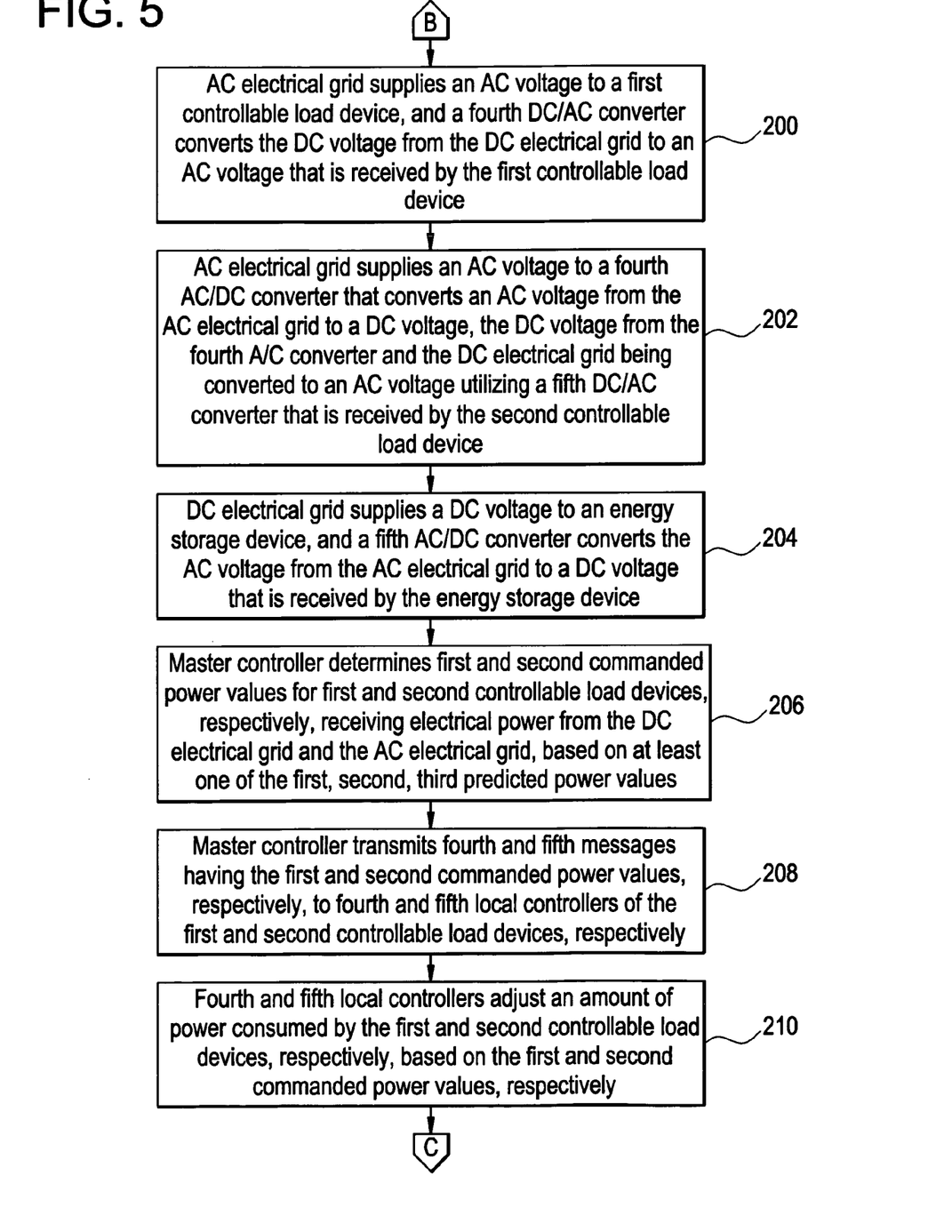

At step 204, the DC electrical grid 34 supplies a DC voltage to the energy storage device 44, and the AC/DC converter 50 converts the AC voltage from the AC electrical grid 36 to a DC voltage that is received by the energy storage device 44.

At step 206, the master controller 58 determines first and second commanded power values (PI, P2) for controllable load devices 40, 42, respectively, receiving electrical power from the DC electrical grid 34 and the AC electrical grid 36, based on at least one of the first, second, third predicted power values.

At step 208, the master controller 58 transmits fourth and fifth messages having the first and second commanded power values (P1, P2), respectively, to local controllers 130, 134 of the controllable load devices, 40, 42 respectively.

At step 210, the local controllers 130, 134 adjust an amount of power consumed by the controllable load devices 40, 42, respectively, based on the first and second commanded power values (P1, P2), respectively.

At step 212, the master controller 58 determines a power storage value (P3) for the energy storage device 44 based on at least one of the first, second, third predicted power values.

At step 214, the master controller 58 transmits a sixth message having the power storage value (P3) to the local controller 150 of the energy storage device 44.

At step 216, the local controller 150 adjusts an amount of power either stored or delivered by the energy storage device 44 to the DC electrical grid 34 based on the power storage value (P3).

Figure 6:
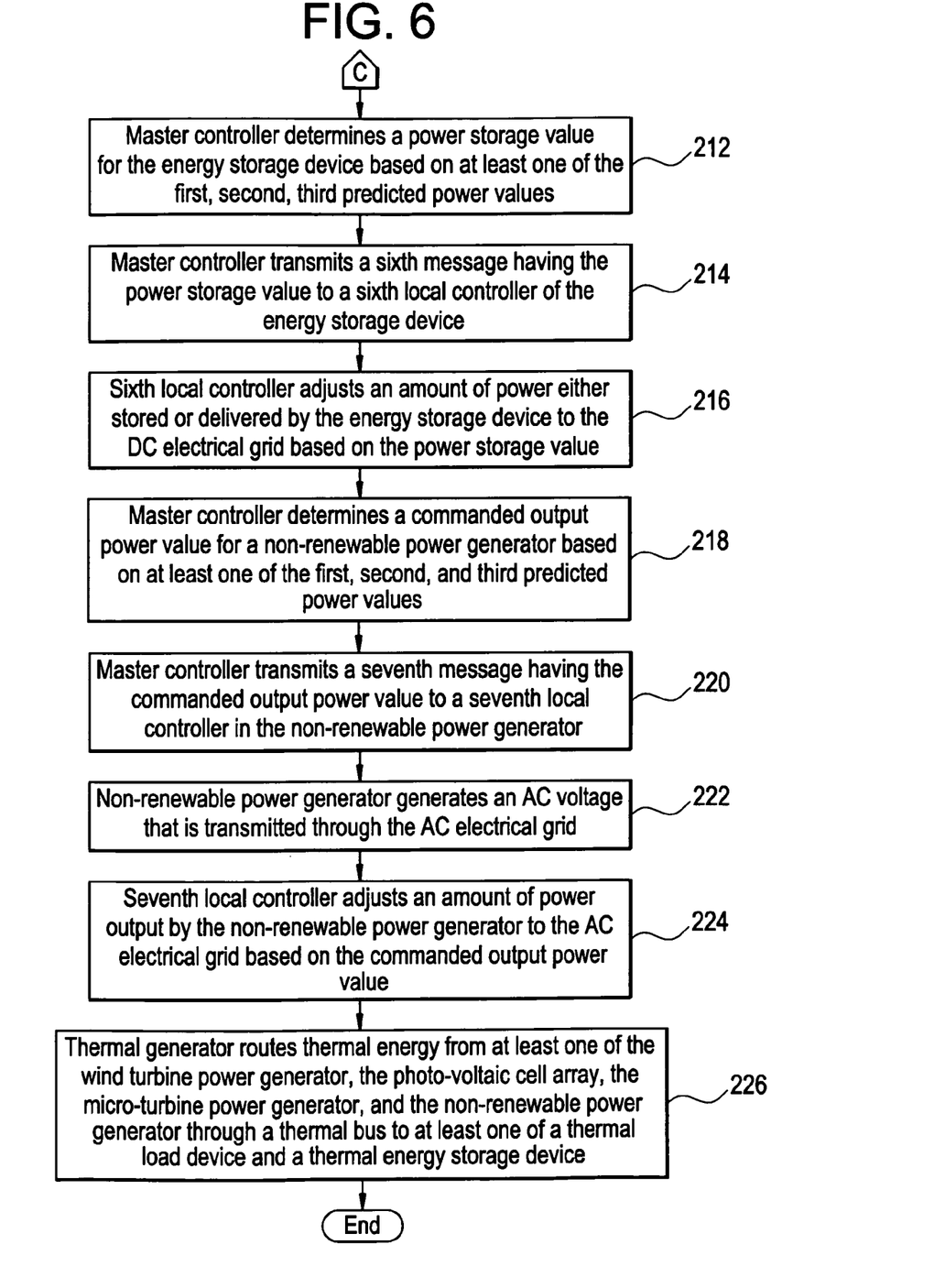

At step 218, the master controller 58 determines a commanded output power value for a non-renewable power generator 32 based on at least one of the first, second, and third predicted power values.

At step 220, the master controller 58 transmits a seventh message having the commanded output power value to a local controller 116 in the non-renewable power generator 32.

At step 222, the non-renewable power generator 32 generates an AC voltage that is transmitted through the AC electrical grid 36.

At step 224, the local controller 116 adjusts an amount of power output by the non-renewable power generator 32 to the AC electrical grid 36 based on the commanded output power value.

At step 226, the thermal generator 62 routes thermal energy from at least one of the wind turbine power generator 20, the photo-voltaic cell array 24, the micro-turbine power generator 28, and the non-renewable power generator 32 through a thermal bus 60 to at least one of a thermal load device 64 and a thermal energy storage device 66. After step 226, the method is exited.

The inventive electrical power generation system 10 and method provide a substantial advantage over other power generation systems. In particular, the electrical power generation system 10 utilizes a master controller for controlling operation of devices coupled to an AC electrical grid and DC electrical grid based on parameter values associated with a renewable power generator.

The above-described methods can be embodied in the form of computer program code containing instructions embodied in tangible media, such as floppy diskettes, CD ROMs, hard drives, or any other computer-readable storage medium, wherein, when the computer program code is loaded into and executed by the master controller 58, and local controllers 80, 96, 106, 116, 130, 134, and 150.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

What is claimed is:

1. An electrical power generation system, comprising:
 a first renewable power generator configured to generate a first AC voltage, the first renewable power generator having a first controller configured to generate a first message having at least a first parameter value associated with the first renewable power generator;
 an AC/DC converter configured to convert the first AC voltage to a DC voltage where at least a portion of the DC voltage is transmitted through a DC electrical grid;
 a DC/AC converter configured to convert a portion of the DC voltage from the AC/DC converter to a second AC voltage that is transmitted through an AC electrical grid; and
 a second controller configured to receive the first message, the second controller further configured to control operation of a first device electrically coupled to at least one of the AC electrical grid and the DC electrical grid based on the first parameter value.

2. The electrical power generation system of claim 1, wherein the first renewable power generator comprises at least one of a wind turbine generator and a geothermal generator.

3. The electrical power generation system of claim 1, wherein the first parameter value comprises a first predicted power value indicating a predicted amount of electrical power to be generated by the first renewable power generator.

4. The electrical power generation system of claim 3, wherein the first device comprises a controllable load device receiving electrical power from at least one of the AC electrical grid and the DC electrical grid.

5. The electrical power generation system of claim 4, wherein the second controller is further configured to determine a first commanded power value based on the first predicted power value, the second controller further configured to generate a second message having the first commanded power value that is received by the controllable load device, the controllable load device configured to adjust an amount of power consumed by the controllable load device based on the first commanded power value.

6. The electrical power generation system of claim 4, wherein the controllable load device comprises at least one of an electrolyzer device, a desalination device, an electrical light, and an electrical motor.

7. The electrical power generation system of claim 3, wherein the first device comprises an energy storage device receiving electrical power from at least one of the AC electrical grid and the DC electrical grid.

8. The electrical power generation system of claim 7, wherein the second controller is further configured to determine a first power storage value based on the first predicted power value, the second controller further configured to generate a second message having the first power storage value that is received by the energy storage device, the energy storage device configured to adjust an amount of power stored or delivered to the DC electrical grid from the energy storage device based on the first power storage value.

9. The electrical power generation system of claim 7, wherein the first device comprises a non-renewable power generator electrically coupled to the AC electrical grid.

10. The electrical power generation system of claim 9, wherein the second controller is further configured to determine a first commanded output power value based on the first predicted power value, the second controller further configured to generate a second message having the first commanded output power value that is received by the non-renewable power generator, the non-renewable power generator configured to adjust an amount of power delivered to the AC electrical grid based on the first commanded output power value.

11. The electrical power generation system of claim 1, further comprising a thermal bus fluidly coupled to at least one of the first renewable power generator and a non-renewable power generator, the thermal bus configured to route heat energy generated by the at least one first renewable power generator and the non-renewable power generator to a thermal load.

12. The electrical power generation system of claim 11, wherein the thermal bus comprises a conduit configured to route either a fluid or a gas to the first renewable power generator to extract heat energy from the first renewable power generator and then to route the fluid or gas to the thermal load.

13. The electrical power generation system of claim 1, wherein the first device is electrically coupled to at least one of the AC electrical grid and the DC electrical grid through a power conditioning device.

14. A method for generating electrical power utilizing an electrical power generation system, the system having a first renewable power generator having a first controller, the first renewable power generator configured to generate a first AC voltage, the system further having an AC/DC converter electrically coupled between the first renewable power generator and a DC electrical grid, the system further having a DC/AC converter electrically coupled between the AC/DC converter and an AC electrical grid, the system further having a second controller operably communicating with the first controller, the method comprising:

generating a first AC voltage utilizing the first renewable power generator;

converting the first AC voltage to a DC voltage utilizing the AC/DC converter where at least a portion of the DC voltage is transmitted through the DC electrical grid;

converting a portion of the DC voltage from the AC/DC converter to a second AC voltage utilizing the DC/AC converter that is transmitted through the AC electrical grid;

generating a first message having at least a first parameter value that is associated with the first renewable power generator utilizing the first controller, that is received by the second controller; and controlling operation of a first device electrically coupled to at least one of the AC electrical grid and the DC electrical grid based on the first parameter value utilizing the second controller.

15. The method of claim 14, wherein the first parameter value comprises a first predicted power value indicating a predicted amount of electrical power to be generated by the first renewable power generator.

16. The method of claim 15, wherein the first device comprises a controllable load device receiving electrical power from at least one of the AC electrical grid and the DC electrical grid.

17. The method of claim 16, further comprising:

determining a first commanded power value based on the first predicted power value utilizing the second controller;

generating a second message having the first commanded power value utilizing the second controller, that is received by the controllable load device; and adjusting an amount of power consumed by the controllable load device from at least one of the AC electrical grid and the DC electrical grid based on the first commanded power value.

18. The method of claim 15, wherein the first device comprises an energy storage device receiving electrical power from at least one of the AC electrical grid and the DC electrical grid.

19. The method of claim 18, further comprising:

determining a first power storage value based on the first predicted power value utilizing the second controller;

generating a second message having the first power storage value utilizing the second controller, that is received by the energy storage device; and adjusting an amount of power stored or delivered to the DC electrical grid from the energy storage device based on the first power storage value.

20. The method of claim 15, wherein the first device comprises a non-renewable power generator electrically coupled to the AC electrical grid.

21. The method of claim 20, further comprising:

determining a first commanded output power value based on the first predicted power value utilizing the second controller;

generating a second message having the first commanded output power value utilizing the second controller, that is received by the non-renewable power generator; and adjusting an adjusting an amount of power delivered to the AC electrical grid based on the first commanded output power value.

22. The method of claim 14, further comprising routing heat energy from the first renewable power generator to a thermal load utilizing a thermal bus fluidly coupled to the first renewable power generator.

* * * * *